United States Patent [19]

Itoh

[11] Patent Number: 4,562,394
[45] Date of Patent: Dec. 31, 1985

[54] MOTOR SERVO CIRCUIT FOR A MAGNETIC RECORDING AND REPRODUCING APPARATUS

[75] Inventor: Kenji Itoh, Yokohama, Japan

[73] Assignee: Victor Company of Japan, Ltd., Japan

[21] Appl. No.: 670,808

[22] Filed: Nov. 13, 1984

[30] Foreign Application Priority Data

Nov. 14, 1983 [JP] Japan ................................ 58-212577

[51] Int. Cl.⁴ ...................... H02P 7/00; H03D 13/00; G05B 1/03
[52] U.S. Cl. .................................. 318/608; 318/603; 318/85; 318/318
[58] Field of Search ................. 318/608, 85, 606, 611, 318/615, 603, 314, 318, 341; 331/1 A, 12

[56] References Cited

U.S. PATENT DOCUMENTS 4,243,921 1/1981 Tamura ........................... 318/608 X Primary Examiner—William M. Shoop, Jr.
Assistant Examiner—Patrick C. Keane
Attorney, Agent, or Firm—Andrus, Sceales, Starke & Sawall

[57] ABSTRACT

A motor servo circuit is used in a recording and reproducing apparatus which comprises a loop including a comparator for comparing the phases of a signal which is responsive to the rotation of a motor and a reference signal and for controlling the rotation of the motor responsive to an output error signal. The circuit comprises an oscillator for producing a signal having a frequency which is higher than a frequency of the reference signal, a counter for counting the output of the oscillator, which counter resets itself when a full count ff is reached and is reset when a reset signal is applied thereto before the full count ff is reached, a circuit for detecting that the count has reached a first value C1 (C1 < ff), and for supplying the reference signal to the comparator, a circuit for detecting that the count has reached a second value C2 (C1 < C2 < ff) and a third value C3 (C3 < C1), and for producing a gate signal during a time period it takes for the count to reach the third value C3 from the second value C2, and a gate circuit responsive to the gate signal, for supplying a vertical synchronizing signal within an input video signal which is to be recorded on a recording medium by the apparatus to the counter as the reset signal.

7 Claims, 13 Drawing Figures

MOTOR SERVO CIRCUIT FOR A MAGNETIC RECORDING AND REPRODUCING APPARATUS

BACKGROUND OF THE INVENTION

The present invention generally relates to motor servo circuits for magnetic recording and reproducing apparatuses, and more particularly to a motor servo circuit for a magnetic recording and reproducing apparatus, which can carry out a satisfactory servo operation even when a pulse of a vertical synchronizing signal within an input video signal is lacking.

Generally, in a magnetic recording and reproducing apparatus which records and reproduces a video on and from a magnetic tape by use of rotary heads, there is provided a motor servo circuit for controlling the rotation of a motor which rotates the rotary heads. In this type of a motor servo circuit, the rotation of the motor is controlled in the following manner. That is, during a recording mode of the recording and reproducing apparatus, the motor servo circuit compares the phase of a signal which is obtained by detecting the rotation of the motor with the phase of a reference signal which is obtained from a vertical synchronizing signal within an input video signal, and the rotation of the motor is controlled responsive to an error output which is obtained as a result of the phase comparison. On the other hand, during a reproducing mode of the recording and reproducing apparatus, the motor servo circuit uses for the phase comparison a reference signal which is obtained from an output signal of a reference oscillator, instead of using the reference signal which is obtained from the vertical synchronizing signal. Thus, during the recording mode of the recording and reproducing apparatus, a separating circuit for separating the vertical synchronizing signal from the input video signal and a circuit for frequency-dividing the separated vertical synchronizing signal and for producing the reference signal, are used to obtain the reference signal.

However, there are cases where the vertical synchronizing signal cannot be separated from the input video signal in the separating circuit. Such cases are introduced when a D.C. level change occurs in the received video signal at a switching point of a picture, when the video signal receiving condition is poor and ghost images occur, and when the video signal is received under a weak electric field condition. In addition, when the input video signal is obtained from a television camera, for example, and the input video signal is dropped out for some reason, it is also impossible to separate the vertical synchronizing signal in the separating circuit. When the vertical synchronizing signal cannot be separated in the separating circuit and the reference signal is accordingly lacking, the motor servo circuit runs out of synchronism and the motor servo circuit can no longer carry out a correct servo operation to control the rotation of the motor.

For this reason, as will be described later on in the specification in conjunction with a drawing, a conventional motor servo circuit is provided with a detecting circuit for detecting a lack of the vertical synchronizing signal, and a switching circuit responsive to an output detection signal of the detecting circuit, for carrying out a switching and for supplying to a phase comparator the reference signal which is obtained from the output signal of the reference oscillator instead of the reference signal which is obtained from the vertical synchronizing signal. Accordingly, when the vertical synchronizing signal is lacking, the conventional motor servo circuit uses the reference signal which is obtained from the output signal of the reference oscillator. However, in normal practice, the output signal of the reference oscillator and the vertical synchronizing signal within the input video signal, are not in synchronism with each other. Hence, when a switching takes place in the switching circuit and the reference signal supplied to the phase comparator is switched from the reference signal which is obtained from the vertical synchronizing signal to the reference signal which is obtained from the output signal of the reference oscillator, the motor servo circuit does not assume a synchronized state immediately after the reference signal supplied to the phase comparator is switched. In other words, there is a problem in that it takes a certain time for the motor servo circuit to assume the synchronized state and carry out the correct servo operation.

In addition, the detecting circuit described before, is generally designed to detect the lack of the vertical synchronizing signal when several pulses of the vertical synchronizing signal are continuously lacking. For example, the detecting circuit will not detect the lack of the vertical synchronizing signal even when one pulse of the vertical synchronizing signal is lacking. Thus, in a case where on pulse of the vertical synchronizing signal is lacking, the switching circuit described before will not operate. On the other hand, the motor servo circuit is generally designed to operate in synchronism with every other pulse of the vertical synchronizing signal, and no problems will occur even when one of the pulses of the vertical synchronizing signal which do not affect the operation of the motor servo circuit is lacking. However, when one of the pulses of the vertical synchronizing signal which affect the operation of the motor servo circuit is lacking, the motor servo circuit operates so as to synchronize with a subsequent pulse of the vertical synchronizing signal. As a result, an instantaneous phase shift occurs and an instability is introduced in the servo operation. Therefore, there is a problem in that it takes a certain time for the servo operation to return to the normal stable state.

SUMMARY OF THE INVENTION

Accordingly, it is a general object of the present invention to provide a novel and useful motor servo circuit for a magnetic recording and reproducing apparatus, in which the problems described heretofore are eliminated.

Another and more specific object of the present invention is to provide a motor servo circuit for a magnetic recording and reproducing apparatus which comprises a loop including phase comparator means for comparing the phase of a signal which is responsive to the rotation of a motor with the phase of a reference signal and for controlling the rotation of the motor responsive to an error signal which is obtained as a result of the phase comparison. The motor servo circuit according to the present invention comprises oscillator means for producing a signal having a frequency which is higher than a frequency of the reference signal, a counter for counting the output signal of the oscillator means, which counter resets itself when a counted value reaches a full count and is reset when a reset signal is applied thereto before the full count is reached, a circuit for detecting that the counted value in the counter has reached a first counted value which is smaller than the full count and for supplying the reference signal to the phase comparator means, a circuit for detecting that the counted value in the counter has reached a second counted value which is larger than the first counted value and is smaller than the full count and a third counted value which is smaller than the first counted value, and for producing a gate signal during a time period it takes for the counted value in the counter to reach the third counted value from the second counted value, where the time period includes therein a time when the counter is reset, and a gate circuit responsive to the gate signal, for supplying a vertical synchronizing signal within an input video signal which is to be recorded on a recording medium by the recording and reproducing apparatus to the counter as the reset signal.

According to the motor servo circuit of the present invention, the counter resets itself even when the vertical synchronizing signal is lacking at the time of a recording. Hence, the counter continues to be reset and the counting operation is repeated even when there is no external reset signal, and the reference signal is produced in a continuous manner. Hence, there will be no absence of the reference signal as in the case of the conventional circuit which obtains the reference signal solely from the vertical synchronizing signal at the time of the recording. As a result, it is possible to stably control the rotation of a motor, and it is unnecessary to provide a special circuit for detecting the lack of the vertical synchronizing signal. The circuit construction of the motor servo circuit according to the present invention is thus simple. Further, the phase of the reference signal which is produced before the counter is reset, and the phase of the reference signal which is produced after the counter resets itself when the vertical synchronizing signal is lacking at the time of the recording, coincide. In the conventional circuit described before, it takes a certain time for the phase of the reference signal produced after the switching takes place to coincide with the phase of the reference signal produced before the switching takes place, however, such a problem does not occur in the motor servo circuit according to the present invention. Therefore, according to the motor servo circuit of the present invention, it is constantly possible to stably control the rotation of the motor.

Other objects and further features of the present invention will be apparent from the following detailed description when read in conjunction with the accompanying drawings.

DETAILED DESCRIPTION

Figure 1:
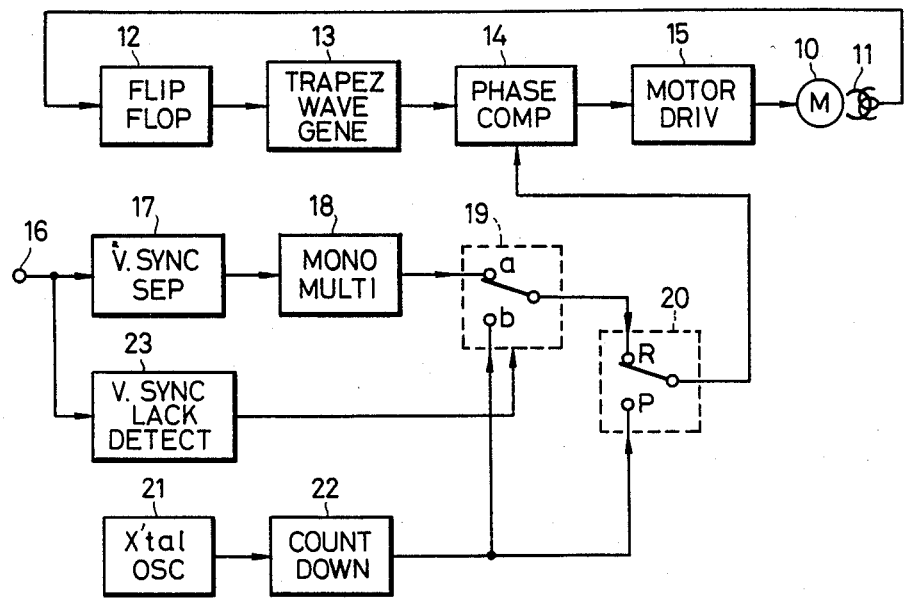
FIG. 1 is a systematic block diagram showing an example of a conventional motor servo circuit for a magnetic recording and reproducing apparatus.

FIG. 1 shows an example of a conventional motor servo circuit. A rotation detector 11 produces a signal having a frequency dependent on the rotational speed of a motor 10. The motor 10 rotates rotary heads (not shown) of a magnetic recording and reproducing apparatus. The output signal of the rotation detector 11 is supplied to a flip-flop 12 wherein the signal is converted into a rectangular wave, and the output rectangular wave of the flip-flop 13 is supplied to a trapezoidal wave generating circuit 13 wherein the rectangular wave is converted into a trapezoidal wave. The output trapezoidal wave of the trapezoidal wave generating circuit 13 is supplied to a phase comparator 14.

On the other hand, an input video signal which is the same as a video signal which is recorded on a magnetic tape (not shown) by the rotary heads which are rotated by the motor 10, is applied to an input terminal 16 and is supplied to a vertical synchronizing signal separating circuit 17. The separating circuit 17 separates a vertical synchronizing signal from the input video signal. The vertical synchronizing signal which is separated in the separating circuit 17 and has a frequency of 60 Hz, is supplied to a monostable multivibrator 18 wherein the signal is formed into a signal having a frequency of 30 Hz. The input video signal applied to the input terminal 16, is also supplied to a vertical synchronizing signal lack detecting circuit 23. The detecting circuit 23 detects whether the vertical synchronizing signal is lacking in the input video signal. The detecting circuit 23 produces no output when there is no lack of the vertical synchronizing signal, and a switch 19 remains connected to a terminal a. In addition, during a recording mode of the recording and reproducing apparatus, a switch 20 is switched over and connected to a terminal R responsive to the switching of mode switching means (not shown). Accordingly, an output signal of the monostable multivibrator 18 is passed through the switches 19 and 20, and is supplied to the phase comparator 14. The phase comparator 14 compares the phases of the output signals of the trapezoidal wave generating circuit 13 and the monostable multivibrator 18, and produces a phase error signal. The output phase error signal of the monostable multivibrator 18 is supplied to a motor driving circuit 15, and the rotational phase of the motor is controlled responsive to an output signal of the motor driving circuit 15.

An output signal of a crystal oscillator 21 is supplied to a count down circuit 22 wherein the signal is frequency-divided into a reference signal having a frequency of 30 Hz. During a reproducing mode (play mode) of the recording and reproducing apparatus, the switch 20 is connected to a terminal P. Accordingly, during the reproducing mode, the output reference signal of the count down circuit 22 is passed through the switch 20 and is supplied to the phase comparator 14. Thus, during the reproducing mode, the phase comparator 14 compares the phases of the output signals of the trapezoidal wave generating circuit 13 and the count down circuit 22.

When the lack of the vertical synchronizing signal is detected in the detecting circuit 23 during the recording mode, the switch 19 is switched over and connected to a terminal b responsive to an output detection signal of the detecting circuit 23. As a result, the output reference signal of the count down circuit 22 is passed through the switches 19 and 20, and is supplied to the phase comparator 14 instead of the output signal of the monostable multivibrator 18. However, as described before, when the lack of the vertical synchronizing signal is detected and the output reference signal of the count down circuit 22 is supplied to the phase comparator 14 instead of the output signal of the monostable multivibrator 18, the phase of the reference signal supplied to the phase comparator 14 does not necessarily coincide with the phase of a signal which should have been supplied to the phase comparator 14 from the monostable multivibrator 18. In most cases, the phase of the reference signal supplied to the phase comparator 14 does not coincide with the phase of the signal which should have been supplied to the phase comparator 14 from the monostable multivibrator 18. Accordingly, when the switch 19 is switched over and the output reference signal of the count down circuit 22 is supplied to the phase comparator 14, the servo operation of the motor servo circuit having a closed loop extending to the motor driving circuit 15 from the rotation detector 11, becomes unstable. Therefore, there is a disadvantage in that it takes a certain time for the servo operation to become phase synchronized with the output reference signal of the count down circuit 22.

Figure 2:
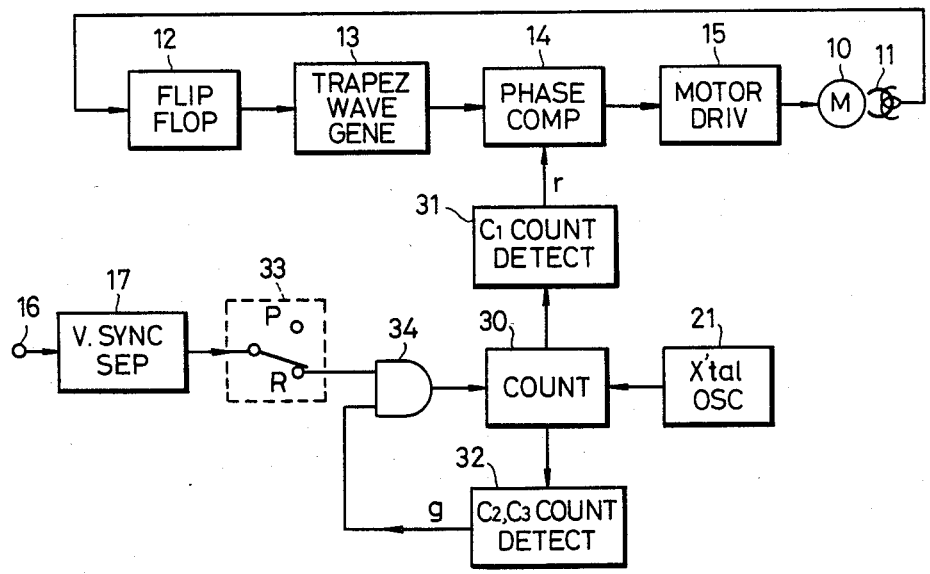
FIG. 2 is a systematic block diagram showing an embodiment of a motor servo circuit for a magnetic recording and reproducing apparatus according to the present invention.

The motor servo circuit according to the present invention has overcome the disadvantage of the conventional circuit described before, and description will now be given with respect to an embodiment of the motor servo circuit according to the present invention by referring to FIG. 2 and figures which follow. In FIG. 2, those parts which are the same as those corresponding parts in FIG. 1 are designated by the same reference numerals, and description thereof will be omitted.

In FIG. 2, a switch 33 is connected to a terminal R during the recording mode. The input video signal applied to the input terminal 16, is supplied to the vertical synchronizing signal separating circuit 17. The separating circuit 17 separates a vertical synchronizing signal shown in FIG. 3(D) which is made up of pulses V1, V2, V3, . . . and has a frequency of 60 Hz. The output vertical synchronizing signal of the separating circuit 17 is passed through the switch 33 and is supplied to an AND gate 34.

Figure 3:
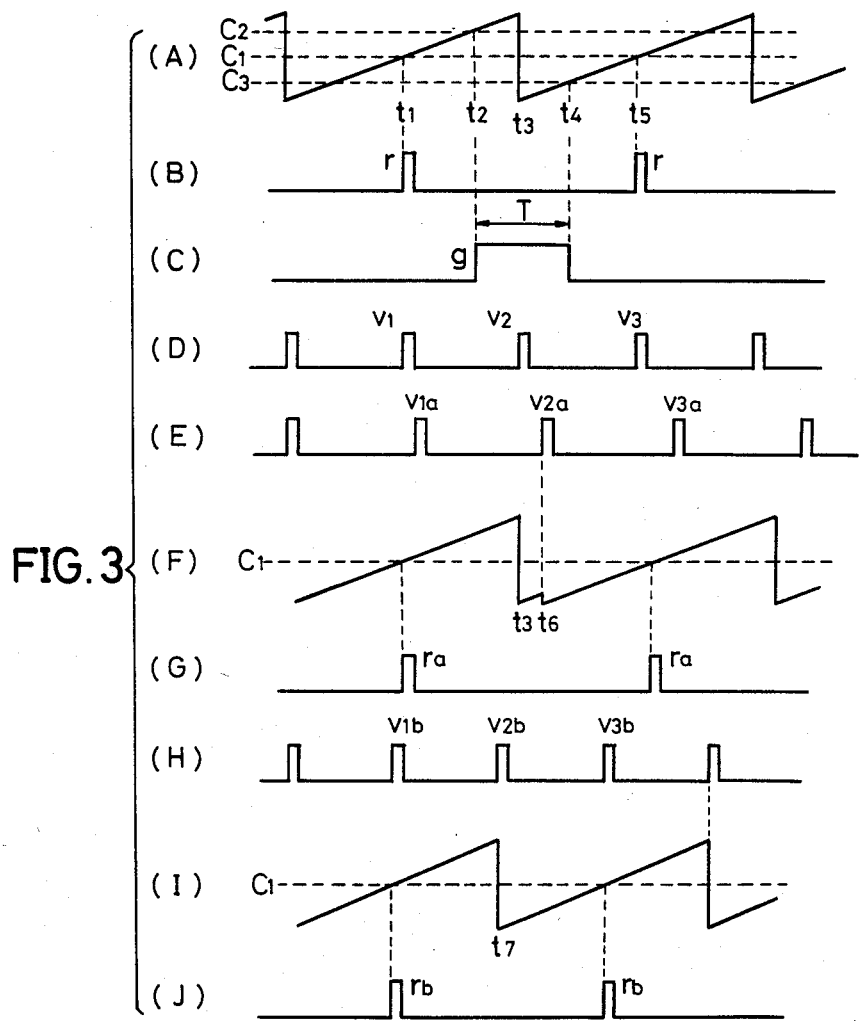
FIGS. 3(A) through 3(J) show signal waveforms at each part of the block system shown in FIG. 2.

The output pulse signal of the crystal oscillator 21 is supplied to a counter 30 wherein the pulse signal is counted. A counted value in the counter 30 is detected in count detecting circuits 31 and 32. The count detecting circuit 31 detects that the counted value of the counter 30, shown in FIG. 3(A), has reached a value C1, and produces a reference signal made up of pulses r at times t1, t5, . . . as shown in FIG. 3(B). The output reference signal of the count detecting circuit 31 is supplied to the phase comparator 14. The phase comparator 14 compares the phase of the output trapezoidal wave of the trapezoidal wave generating circuit 13 and the phase of the output reference signal of the count detecting circuit 31.

The counter 30 is of a type which resets itself when the counted value reaches a full count. For example, the counter 30 resets itself at a time t3 as shown in FIG. 3(A), and re-starts the count from zero. The count detecting circuit 32 detects that the counted value of the counter 30 has reached a value C2 which is larger than the value C1 and is smaller than the full count and a value C3 which is larger than zero and is smaller than the value C1. The count detecting circuit 32 produces a gate signal which is made up of a pulse g having a width T (inclusive of the time t3) as shown in FIG. 3(C), during a time period between times t2 and t4 in which the count detecting circuit 32 detects the values C2 and C3. The output gate signal of the count detecting circuit 32 is supplied to the AND gate 34. Hence, among the pulses V1, V2, V3, . . . of the vertical synchronizing signal shown in FIG. 3(D) which are supplied to the AND gate 34, the pulse V2 is passed responsive to the gate signal and is supplied to the counter 30 as a reset signal. Accordingly, the counter 30 is reset by the pulse V2 at the time t3, and the counted value of the counter 30 is reset to zero.

The timing with which the counter 30 resets itself, is set so that the timing with which the counter 30 is reset by the pulse V2 and the timing with which the counter 30 resets itself when the full count is reached, are the same when the pulses V1, V2, V3, . . . of the vertical synchronizing signal are obtained with the regular phase without a phase advancement or a phase lag. As a result, the reference signal which is made up of the pulses r and has a frequency of 30 Hz, is obtained from the count detecting circuit 31.

In a case where the period of pulses V1a, V2a, V3a, . . . of the vertical synchronizing signal within the input video signal, is slightly advanced with respect to the pulses of the vertical synchronizing signal shown in FIG. 3(D) for some reason, as may be seen from FIG. 3(E), the counter 30 resets itself at the time t3 and is thereafter reset by the pulse V2a at a time t6 so as to re-start the count as shown in FIG. 3(F). When the counted value in the counter 30 reaches the value C1, a signal made up of pulses $r_a$ as shown in FIG. 3(G) is produced from the count detecting circuit 31.

On the other hand, in a case where the period of pulses V1b, V2b, V3b, . . . of the vertical synchronizing signal within the input video signal, is slightly lagging with respect to the pulses of the vertical synchronizing signal shown in FIG. 3(D) for some reason, as may be seen from FIG. 3(H), the counter 30 is reset by the pulse V2b at a time t7 so as to re-start the count before the counter 30 resets itself at the time t3 as shown in FIG. 3(I). When the counted value in the counter 30 reaches the value C1, a signal made up of pulses $r_b$ as shown in FIG. 3(J) is produced from the count detecting circuit 31.

Accordingly, even when the period of the pulses of the vertical synchronizing signal within the input video signal changes, the period of the reference signal obtained from the count detecting circuit 31 follows the change in the period of the pulses of the vertical synchronizing signal. Therefore, during the recording mode, the motor servo circuit can carry out a servo operation which constantly follows the input video signal.

During the reproducing mode, the switch 33 is switched over and connected to a terminal P. The counter 30 will not be reset by a signal from the AND gate 34. The counter 30 resets itself when the full count is reached as shown in FIG. 3(A). Hence, the reference signal made up of the pulses r as shown in FIG. 3(B), is obtained from the count detecting circuit 31.

Next, description will be given with respect to the operation of the motor servo circuit which is peculiar to the present invention, for a case where no vertical synchronizing signal is obtained from the vertical synchronizing signal separating circuit 17 for some reason.

When no vertical synchronizing signal is obtained from the separating circuit 17 for some reason during the recording mode, the AND gate 34 is no longer applied with the vertical synchronizing signal shown in FIG. 3(D). Thus, the counter 30 will no longer be reset by the pulse of the vertical synchronizing signal. However, as described before, the counter 30 is designed to reset itself when the counted value reaches the full count. Accordingly, as in the case at the time of the reproducing mode, the counter 30 resets itself at the time t3 as shown in FIG. 3(A). The counter 30 re-starts the count from the time when the counter 30 resets itself, and the reference signal made up of the pulses r is produced from the count detecting circuit 31 when the counted value in the counter 30 reaches the value C1. Consequently, even when the vertical synchronizing signal is lacking, the regular reference signal is supplied to the phase comparator 14, and the motor servo circuit can carry out a normal servo operation with respect to the motor 10. Because the timing with which the counter 30 resets itself is set so as to be the same as the timing with which the counter 30 is reset by the pulse V2 of the vertical synchronizing signal, no phase shift will be introduced in the reference signal which is obtained from the count detecting circuit 31 and the servo operation can be carried out stably, even when the counter 30 is caused to reset itself due to the lack of the vertical synchronizing signal.

Figure 4:
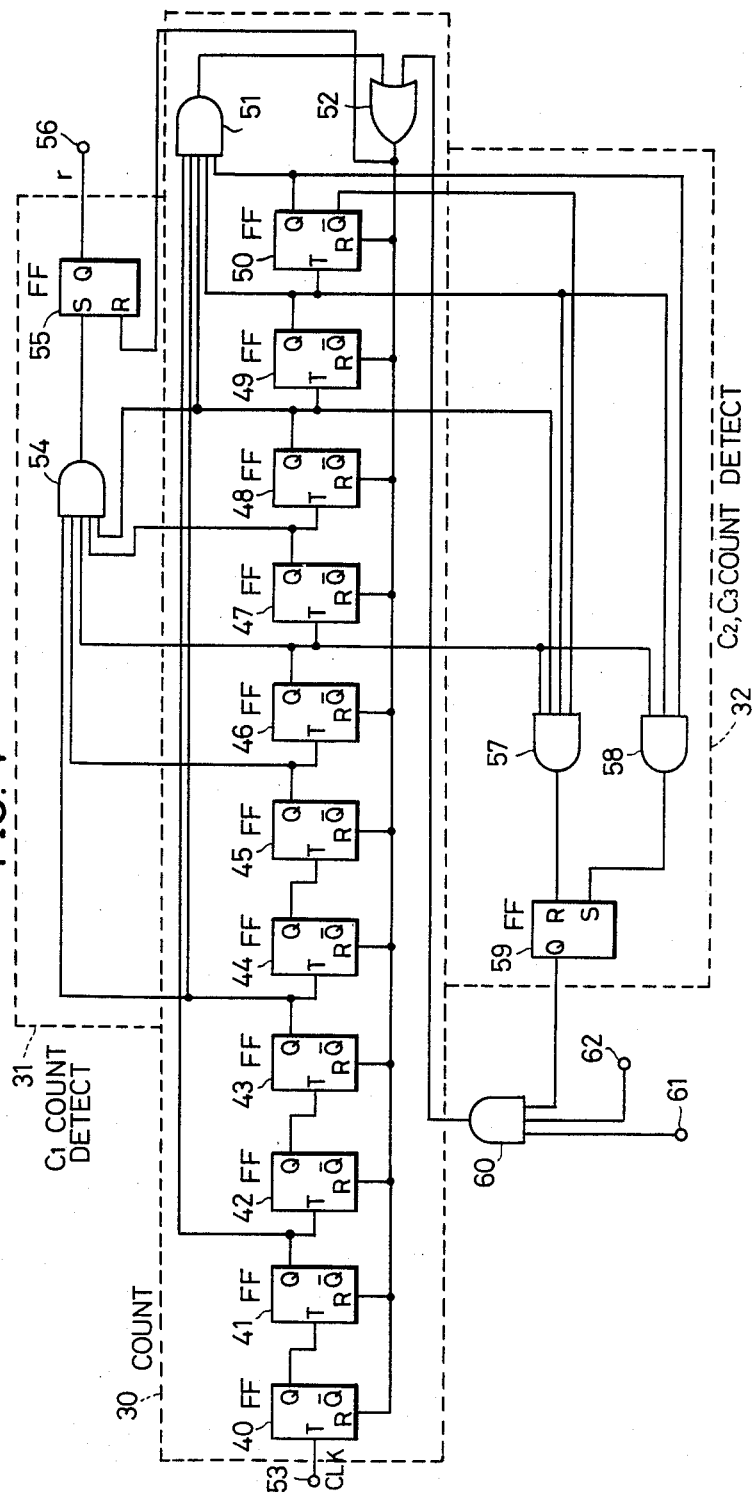
FIG. 4 is a systematic circuit diagram showing an essential part of the block system shown in FIG. 2.

Next, description will be given with respect to a concrete circuit example for realizing the counter 30 and the count detecting circuits 31 and 32 described before, by referring to FIG. 4. In FIG. 4, those parts which are the same as those corresponding parts in FIG. 2 are designated by the same reference numerals.

In FIG. 4, trigger type flip-flops 40 through 50 which are coupled in series, an AND gate 51, and an OR gate 52, constitute the self-reset type counter 30 shown in FIG. 2. The flip-flops 40 through 50 are coupled so that a Q-output of a flip-flop which is provided in a stage i, where i is an arbitrary integer which is greater than one and is less than eleven, is applied to a trigger input terminal T of a flip-flop which is provided in a stage i+1. Q-outputs of the flip-flops 41, 43, 48, 49, and 50 are applied to the AND gate 51. Clock pulses which are obtained by appropriately counting down the output signal of the crystal oscillator 21 shown in FIG. 2, are applied to an input terminal 53. The clock pulses are applied to a trigger input terminal T of the flip-flop 40 which is provided in the first stage, and are successively counted in the flip-flops 41 through 50 which are provided in the subsequent stages. When the number of counted clock pulses reaches the full count, an output signal is produced from the AND gate 51. This output signal of the AND gate 51 is passed through the OR gate 52, and is applied to reset terminals R of all of the flip-flops 40 through 50 so as to reset all of the flip-flops 40 through 50. As a result, the counter 30 resets itself when the full count is reached.

An AND gate 54 and a flip-flop 55 constitute the count detecting circuit 31 shown in FIG. 2. Q-outputs of the flip-flops 43 and 45 through 48 within the counter 30, are supplied to the AND gate 54. When the counted value in the counter 30 reaches the value c1, the flip-flops 43 and 45 through 48 produce the Q-outputs. Hence, an output signal is produced from the AND gate 54 when the counted value in the counter 30 reaches the full count. This output signal of the AND gate 54 is applied to a set terminal S of the flip-flop 55. In this state, the flip-flop 55 produces a Q-output, and the pulses r of the reference signal are obtained as rising edges in the Q-output of the flip-flop 55 through an output terminal 56. An output signal of the OR gate 52 is applied to a reset terminal R of the flip-flop 55 so as to reset the flip-flop 55.

AND gates 57 and 58 and a flip-flop 59 constitute the count detecting circuit 32 shown in FIG. 2. Q-outputs of the flip-flops 46, 48, and 49 and a $\overline{Q}$-output of the flip-flop 50 are supplied to the AND gate 57. On the other hand, Q-outputs of the flip-flops 46, 49, and 50 are supplied to the AND gate 58. An output signal of the AND gate 58 is applied to a set terminal S of the flip-flop 59, and an output signal of the AND gate 57 is applied to a reset terminal R of the flip-flop 59. Accordingly, the flip-flop 59 is set by the output signal of the AND gate 58 when the counted value in the counter 30 reaches the value C2. On the other hand, the flip-flop 59 is reset by the output signal of the AND gate 57 when the counted value in the counter 30 reaches the value C3. As a result, the flip-flop 59 produces from a Q-output terminal thereof the gate signal shown in FIG. 3(C) which is made up of the gate pulse g having the width T.

An AND gate 60 functions as the switch 33 and the AND gate 34 shown in FIG. 2. The vertical synchronizing signal which is separated in the vertical synchronizing signal separating circuit 17, is applied to an input terminal 61. A high-level signal is applied to an input terminal 62 during the recording mode. The AND gate 60 produces an output signal when all of the three input signals thereof exist. The output signal of the AND gate 60 is passed through the OR gate 52, and is applied to the reset terminals R of all of the flip-flops 40 through 50 so as to reset all of the flip-flops 40 through 50. Accordingly, the flip-flops 40 through 50 are reset by the output signal of the AND gate 51 which is obtained when the counted value in the counter 30 reaches the full count, or are reset during the recording mode when the vertical synchronizing signal is applied to the input terminal 61 in a state where the flip-flop 59 is producing the gate signal.

Further, the present invention is not limited to these embodiments, but further variations and modifications may be made without departing from the scope of the present invention.

What is claimed is:

1. A motor servo circuit for a magnetic recording and reproducing apparatus which comprises a loop including phase comparing means for comparing the phase of a signal which is responsive to the rotation of a motor with the phase of a reference signal and for controlling the rotation of the motor responsive to an error signal which is obtained as a result of the phase comparison, said motor servo circuit comprising:

oscillator means for producing a signal having a frequency which is higher than a frequency of the reference signal;

a counter for counting the output signal of the oscillator means, said counter resetting itself when a counted value reaches a full count and being reset when a reset signal is applied thereto before the full count is reached;

a first detecting circuit for detecting that the counted value in the counter has reached a first counted value which is smaller than the full count, and for supplying the reference signal to the phase comparator means;

a second detecting circuit for detecting that the counted value in the counter has reached a second counted value which is larger than the first counted value and is smaller than the full count and a third counted value which is smaller than the first counted value, and for producing a gate signal during a time period it takes for the counted value in the counter to reach the third counted value from the second counted value, said time period including therein a time when the counter is reset; and a gate circuit responsive to the gate signal, for supplying a vertical synchronizing signal within an input video signal which is to be recorded on a recording medium by the recording and reproducing apparatus to the counter as the reset signal.

2. A motor servo circuit as claimed in claim 1 in which the value of said full count is set so that a timing with which the counter resets itself when the counter value reaches the full count, is the same as a timing with which the counter is reset by the vertical synchronizing signal within the input video signal when the vertical synchronizing signal is obtained in a normal manner.

3. A motor servo circuit as claimed in claim 1 in which said counter comprises a plurality of flip-flops which are coupled in series, each of said plurality of flip-flops having a reset terminal, and a first AND gate having input terminals coupled to output terminals of first predetermined flip-flops among said plurality of flip-flops, said first AND gate detecting that all of Q-outputs of said first predetermined flip-flops exist when said plurality of flip-flops perform counting until the full count is reached and supplying an output signal to the reset terminals of said plurality of flip-flops so as to reset said plurality of flip-flops.

4. A motor servo circuit as claimed in claim 3 in which said first detecting circuit comprises a second AND gate having input terminals coupled to output terminals of second predetermined flip-flops among said plurality of flip-flops, said second AND gate detecting that all of Q-outputs of said second predetermined flip-flops exist and producing an output signal, and a first other flip-flop having a set terminal applied with the output signal of the second AND gate, said first other flip-flop producing the reference signal.

5. A motor servo circuit as claimed in claim 4 in which said second detecting circuit comprises a third AND gate having input terminals coupled to output terminals of third predetermined flip-flops among said plurality of flip-flops, said third AND gate detecting that all of Q-outputs of said third predetermined flip-flops exist, a fourth AND gate having input terminals coupled to output terminals of fourth predetermined flip-flops among said plurality of flip-flops, said fourth AND gate detecting that all of Q-outputs of said fourth predetermined flip-flops exist, and a second other flip-flop having a reset terminal supplied with an output of said third AND gate and a set terminal supplied with an output of said fourth AND gate, for producing said gate signal.

6. A motor servo circuit as claimed in claim 5 in which said gate circuit comprises a fifth AND gate supplied with said gate signal, a recording mode signal, and the vertical synchronizing signal within said input video signal, said fifth AND gate producing an output signal which is supplied to the reset terminals of all of said plurality of flip-flops in said counter.

7. A motor servo circuit as claimed in claim 6 in which said counter is supplied with the output signals of said first and fifth AND gates, and said counter further comprises an OR gate for producing an output signal which is supplied to the reset terminals of all of said plurality of flip-flops in said counter and to a reset terminal of said first other flip-flop.

* * * * *